United States Patent [19]
Denis et al.

[11] Patent Number: 5,256,341
[45] Date of Patent: Oct. 26, 1993

[54] METHOD AND APPARATUS FOR INFRARED HEATING OF PLASTIC PREFORMS

[75] Inventors: Gerard Denis, Turretot; Rene Hudebine, Le Havre, both of France

[73] Assignee: Sidel, Le Havre Cedex, France

[21] Appl. No.: 904,585

[22] Filed: Jun. 26, 1992

[30] Foreign Application Priority Data

Jul. 1, 1991 [FR] France ............... 91 08158

[51] Int. Cl.⁵ .............. B29C 35/08; B29C 49/66
[52] U.S. Cl. ............................... 264/25; 264/521; 425/174.4; 425/526; 392/407; 392/411; 392/418; 432/10; 432/31
[58] Field of Search ............. 264/25, 521, 520, 535, 264/345, 234; 425/174.4, 526; 219/388; 392/407, 408, 411–415, 418; 432/11, 10, 124, 224, 227, 31

[56] References Cited

U.S. PATENT DOCUMENTS

| | | | |
|---|---|---|---|
| 3,436,524 | 4/1969 | Pauls | 392/411 |
| 3,787,170 | 1/1974 | Gilbert | 264/521 |
| 4,044,086 | 8/1977 | McChesney et al. | 264/520 |
| 4,315,725 | 2/1982 | Yoshino | 264/25 |
| 5,032,700 | 7/1991 | Sugiyama et al. | 264/25 |

FOREIGN PATENT DOCUMENTS

2095611 10/1982 United Kingdom ............. 264/25

Primary Examiner—Catherine Timm
Attorney, Agent, or Firm—Sughrue, Mion, Zinn, Macpeak & Seas

[57] ABSTRACT

A core 6 is disposed inside of and spaced from a hollow plastic preform 1 subjected to external infrared radiation 4 including a first wavelength $B_1$ that is absorbed by and heats the plastic, and a second wavelength $B_2$ that propagates through the wall 2 of the preform. The propagated radiation 12 is converted into the first wavelength by the surface 7 of the core, and reemitted at 13 back towards the preform to heat its internal surface 8 to a higher temperature than its external surface 10. The preform may be axially rotated with the core stationary to implement uniform angular heating. Alternatively, the core may be irregularly configured and/or surface treated, with both the core and preform rotated in synchronism.

14 Claims, 3 Drawing Sheets

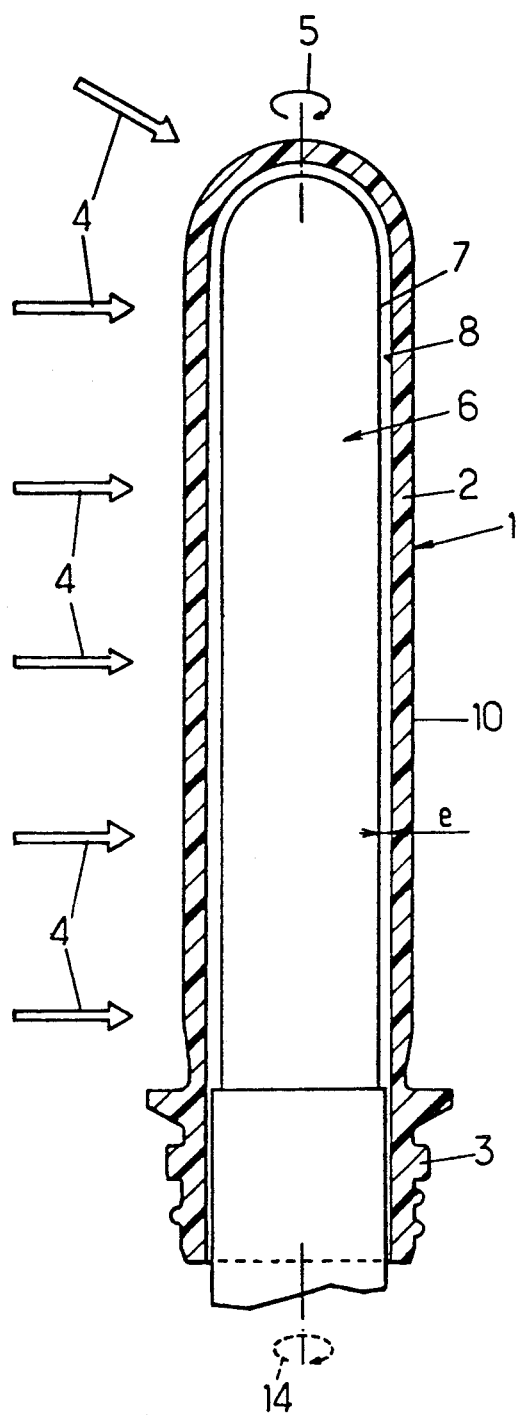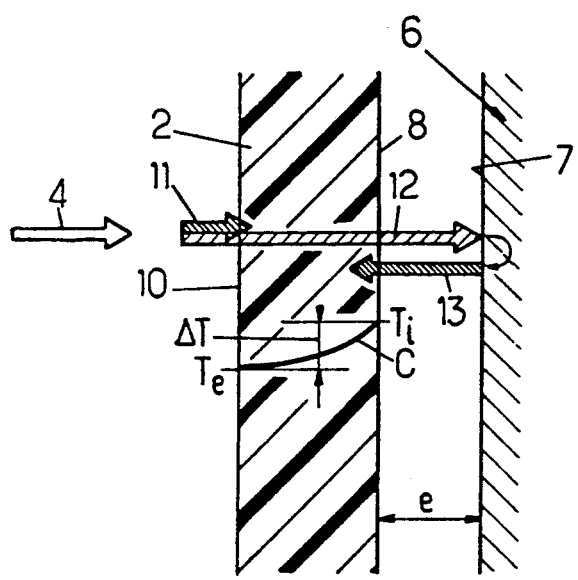

METHOD AND APPARATUS FOR INFRARED HEATING OF PLASTIC PREFORMS

BACKGROUND OF THE INVENTION

This invention relates to the infrared heating of preforms having a fairly thick wall made of plastic, especially polyethylene terephthalate (PET), for the blow moulding or stretch-blow moulding of receptacles like bottles, flasks or the like, and especially to improvements in the methods and apparatuses that implement such heating.

In the prior art, the preforms are heated in scanning furnaces fitted with infrared radiation lamps arranged along the trajectory followed by the preforms, which can also be rotated about their axes, in order to be heated in a uniform fashion. The preforms are heated solely from the outside and, in view of the fairly significant thickness of their walls, the result is the formation of a temperature gradient of sizable value between the external and internal sides of the walls, the internal sides being cooler than the external sides.

During the blow moulding or stretch-blow moulding process which, based on the heated preform, leads to a receptacle with a thin wall, the rate of stretching is different for the internal side and for the external side of the preform wall, the internal side having the highest stretching rate. For example, with a cylindrical receptacle 80 mm in diameter blown from a preform with an internal diameter of 12 mm and an external diameter of 20 mm, the crosswise stretching rate (equal to the ratio of the final diameter over the initial diameter) varies from 6.6 for the internal side of the cylinder to 4 or its external side. However, even though the internal side is the most distorted, it is the one that is the coolest in the heating processes in use. The result is the possibility of faults occurring (ungluing of the internal and external layers of the wall), which are more likely the greater the thickness of the wall.

This problem becomes more serious with reusable bottles, flasks, etc. because the physical/chemical constraints produced by the cleaning operations between two successive uses require fairly substantial thicknesses (for instance 0.8 mm) for the walls of the receptacles, which equates to a thickness of about 4 to 8 mm for the walls of the preforms.

One solution might be altering the heating conditions so that the internal side of the preforms reaches a satisfactory temperature. However, this leads to another major problem whereby the external side reaches an excessively high temperature whereat an undesirable modification of the physical-chemical features of the plastic material occurs. Attempts have been made to attenuate this difficulty by arranging the heating means so that they could approximately homogenize the temperature along the entire thickness of the wall, but this does not resolve the problems associated with the different stretching rates on the internal and external sides of the wall of the preform, or prevent the chance of incidents which might stem therefrom.

Furthermore, an increase in the temperatures translates into an increase in the consumption of electrical energy and/or an increase in the length of exposure of the preforms, and therefore results in a slowdown of the rate of production. At the very least, the result is an increase in the manufacturing costs which is inadmissible.

SUMMARY OF THE INVENTION

The purpose of the invention is basically to propose an original solution to the heating of preforms which will make it possible to avoid the difficulties encountered up to now, even in the case of preforms with very thick walls such as those which are to be used for the manufacturing of reusable bottles, flasks or the like made of PET, without any increase in treatment time and without any increase in the consumption of electrical energy, if not a significant decrease in such consumption.

To this end, an initial aspect of the invention involves a method for heating preforms with a fairly thick wall made of plastic, especially polyethylene terephthalate (PET), for the manufacturing by blow moulding or stretch-blow moulding of receptacles such as bottles, flasks, etc., the heating comprising the radiation of preforms with infrared radiation emitted by at least one source that is external to the preforms to heat the latter roughly crosswise to their axes, the infrared radiation including an initial wavelength band $B_1$ which is absorbed by the plastic material which makes up the wall of the preforms and a second wavelength band $B_2$, distinct from the initial band $B_1$, which is not absorbed by the plastic material and which penetrates inside the internal volume of the preforms. The method is basically characterized in that:

a) in the internal volume of the preforms, the wavelengths, located in the second band $B_2$, of infrared radiation which penetrates inside the internal volume are modified to transform then into radiation included in the first band $B_1$, b) infrared radiation with modified wavelengths is reemitted towards the wall of the preform, and c) the infrared radiation with modified wavelengths, being absorbed by the plastic material which makes up the wall of the preform in the vicinity of its internal surface, heats the plastic material in the vicinity of the internal surface so that the temperature $T_i$ of the internal side of the wall of the preform is greater than the temperature $T_e$ of the external side of said wall.

With the invention, the preform is heated under ideal conditions for operations that it must ultimately be subjected to, in other words, on the one hand, the two sides, external and internal, of its wall are heated, thus producing an increase in temperature at least of the entire material, and on the other hand a decreasing temperature gradient from the internal side to the external side is created (in other words the inverse of the decreasing temperature gradient from the external side toward the internal side encountered in the traditional heating processes that are solely external to the preform), which is entirely in concordance with the difference in stretching rates suffered by the sides during the subsequent blow moulding or stretch-blow moulding operation. Thus, the distortion of the material during the shaping of the receptacle is facilitated, and the ungluing of layers of material one from the other is prevented.

The result is an improved usage of energy by the heating means since the radiation, which penetrated inside the preform and which until now had been lost, now contributes to the heating of the material. The result, as regards the obtaining of a specific temperature for the material, is a decrease in the heating time of more than 30%, a significant decrease of consumed electrical energy and the possibility of designing furnaces for faster heating in scan heating facilities, and hence a substantial savings in the cost of these installations.

Practically speaking, the conversion of the wavelengths of radiation entering into the internal volume of the preforms and the reemission of the radiation at modified wavelengths are obtained by introducing a core in the internal volume. The latter is dimensioned so that the space between the surface of the core and the internal wall of the preform is such that the temperature $T_i$ of the internal surface of the preform, resulting from the absorption of radiation reemitted by the core in the vicinity of the internal surface, is greater than the temperature $T_e$ of the external surface of the preform. Tests have indeed shown that the less space between the surface of the core and the internal wall of the preform, the more significant is the heating of the latter.

If it is desired that the temperature profile of the wall of the preforms is not uniform lengthwise and/or angularly (by rotating around the axis of the preform), an irregular space may be provided between the core and the internal wall of the preform and/or the core may be configured with an irregular surface. In particular, the core may have a surface that displays brilliance and/or an irregular color. Indeed, tests have shown that a brilliant core is less capable than a matte black core of converting wavelengths that reached its surface and reemitting modified radiation. The same thing was highlighted with cores of different color but in different ratios. Thus, it is possible to implement the process of the invention to manufacture receptacles with complex shapes, wherein the manufacturing process involves distortion that is not homogeneous of the entire material, which is followed by non-homogeneous heating of the preforms.

According to a second aspect of the invention, an installation for heating preforms with a fairly thick wall made of plastic material, especially polyethylene terephthalate (PET), for the manufacturing by blow moulding or stretch-blow moulding of receptacles such as bottles, flasks, etc., the installation including heating means that incorporate at least one source of infrared radiation located outside of the preforms to heat them roughly crosswise to their axes, the infrared radiation including an initial wavelength band $B_1$ which is absorbed by the plastic material which makes up the wall of the preforms and a second wavelength band $B_2$, distinct from the initial band $B_1$, which is not absorbed by the plastic material and which penetrates inside the internal volume of the preforms, comprises:

a) wavelength converter means for infrared radiation arranged inside the preforms and set up to convert the infrared radiation with wavelengths included in the second band $B_2$ into infrared radiation with wavelengths included in the first band $B_1$, and b) reemitting means for reemitting the infrared radiation at modified wavelengths towards the wall of the preforms, the converter and reemitting means being arranged so that the temperature $T_i$ of the internal side of the wall of the preforms is greater than the temperature of the external side of said wall.

Preferably, the converter means and the reemitting means are mutually combined and include a core that is introduced inside each preform and having a treated surface, allowing a space from the internal wall of the preform such that the temperature $T_i$ of the internal side of the wall obtained by heating the plastic material having absorbed the infrared radiation reemitted by the core with a modified wavelength is greater than the temperature $T_e$ of the external side of the wall.

In order to obtain a non-homogeneous heating lengthwise and/or angularly of the preform to facilitate the manufacture of receptacles with complex shapes, the surface of the core is not parallel at all points to the internal surface of the wall of the preform so that the space between the surfaces is irregular lengthwise and/or angularly, and/or the surface of the core is treated such that it is not regular lengthwise and/or angularly. In the latter case, the core may have a surface which is brilliant and/or displays a non-regular color.

It is desirable that the space and surface treatment are such that the interval between temperatures $T_i$ and $T_e$, respectively, of the internal and external surfaces of the wall of the preforms should be at least $+50°$ C.

BRIEF DESCRIPTION OF THE DRAWINGS

FIG. 1 is a sectional view that illustrates a proposed preform heating installation in conformity with the invention;

FIG. 2 is a diagram, on an enlarged scale, illustrating the operation of the installation in FIG. 1;

DETAILED DESCRIPTION OF THE PREFERRED EMBODIMENTS

Figure 3:
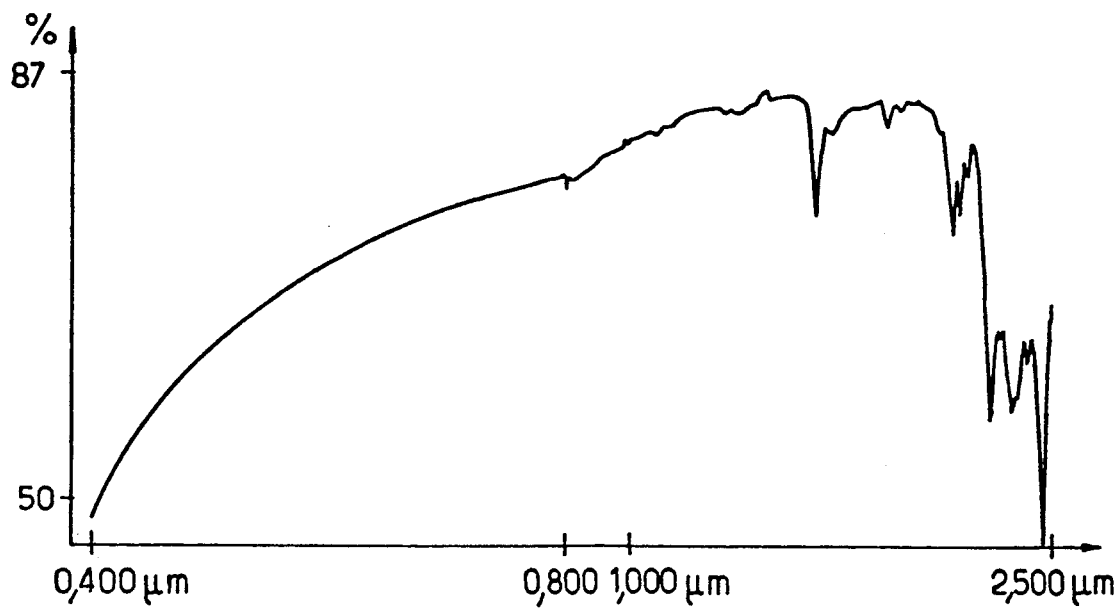
FIGS. 3 and 4 are curves that illustrate, respectively, the transmissiveness of PET and the depth of penetration of the infrared radiation inside the PET according to wavelength.

FIG. 1 shows a preform 1 with a fairly thick wall made of plastic material, especially polyethylene terephthalate (PET), for the manufacturing by blow moulding or stretch-blow moulding of a receptacle such as a bottle, flask, etc. The preform 1, obtained, for example, by injection moulding, has a body 2 with a thick wall and an end 3 which acts as the threaded collar of the future receptacle with its shape and measurements finalized.

The blow moulding or stretch-blow moulding stage for the shaping of the receptacle is preceded by a heating stage designed to soften the plastic material and especially the PET, in order to facilitate the subsequent mechanical distortion stemming from the moulding. The heating stage occurs in a furnace, especially a scanning furnace, for which FIG. 1 only shows the elements required for an understanding of the invention. The furnace includes a row of infrared lamps (diagrammatically illustrated by arrows 4) arranged along the trajectory (here perpendicular to the drawing plane) followed by the preform that has to be heated, and which emit infrared radiation towards the body 2 of the preform and roughly crosswise to it. Uniform heating of the body 2 is obtained, with a single unilateral row of heating lamps, by making the preform rotate (arrow 5) at the same time as it is shifted or advanced lengthwise inside and through the furnace. A reflector (not shown) can be placed facing the lamps, on the other side of the trajectory followed by the preforms (to the right of the preforms in FIG. 1).

Figure 4:
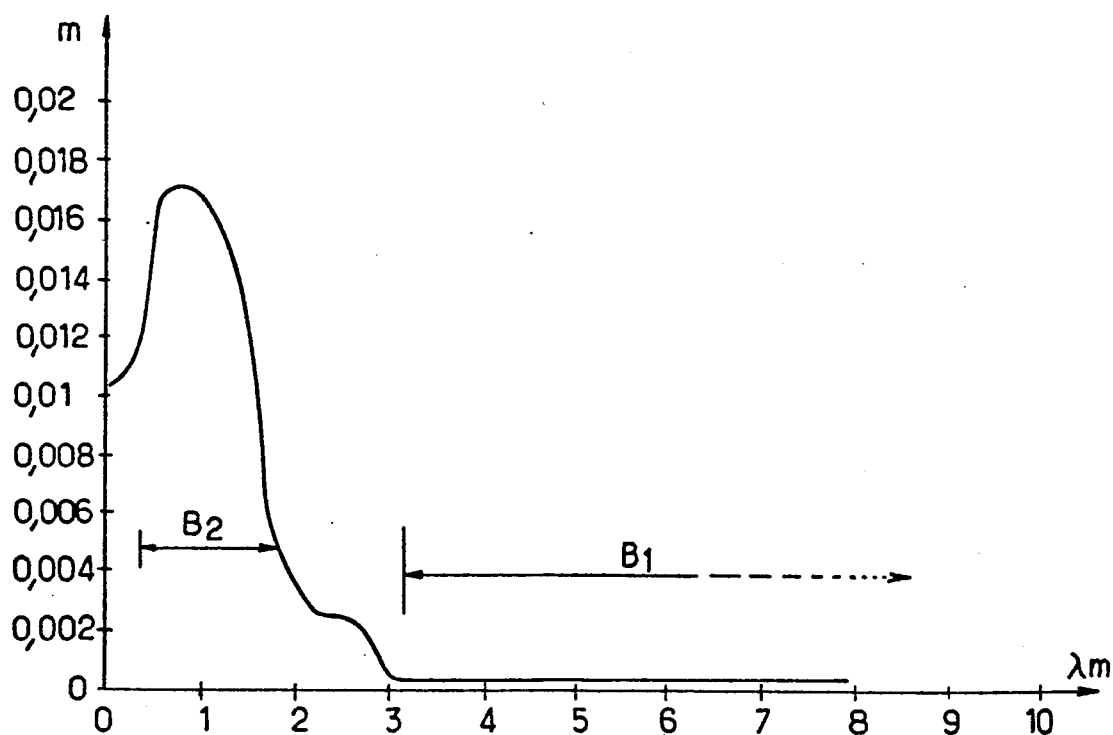

The infrared radiation lamps that are currently used inside furnaces for the heating of preforms have an emission spectrum between about 0.35 and 6 microns. The plastic material that comprises the preform has a transmittance which varies with the wavelength of the ray. FIG. 3 shows the variation of the transmittance (in % of a PET film which is 50 μm thick for wavelengths included between 0.4 μm and 2.5 μm; FIG. 4 shows the variation of the depth (in meters) of penetration of the infrared radiation inside the PET according to the wavelength (penetration depth being the distance for which $I/Io = e^{-1}$, I being the intensity of the radiation at the depth considered and Io the initial intensity).

Based on these curves, and especially that in FIG. 4, it can be seen that the part of the radiation emitted by the heating lamps of which the wavelengths reaching into the inner volume of the preform to transform it into radiation of which the wavelengths included in the previously mentioned band $B_1$ and then to reemit that radiation at modified wavelengths towards the wall of the preform by making sure that the heating in the vicinity of the internal side of the preform (heating due to the absorption of radiation reemitted at modified wavelengths) is greater than the heating in the vicinity of the external side of the preform (heating due to the absorption of radiation coming directly from the heating lamps). To that end, a core 6 is introduced inside the preform, which has a surface 7 that is treated in whole or in part and which allows a space e to subsist with the internal side 8 of the wall 2 of the preform.

Based on the radiation emitted by the heating lamps (arrow 4), a fraction (arrow 11) of the radiation whose wavelengths are located in the band $B_1$ is absorbed by the plastic material comprising the wall and heats the latter at the vicinity of the external side 10. (temperature $T_e$) The fraction (arrow 12) of the radiation whose shorter wavelengths are located in band $B_2$ is not absorbed by the plastic material and is transmitted through the preform to the core 6, whose surface treatment makes it behave more or less like a black core and heats up to a temperature T. The result is that the core 6 emits in turn (Wien's law) a radiation with an optimal wavelength $\lambda_{max} = 2898/T$ ($\lambda_{max}$ in μm and T in °K) back towards the wall of the preform (arrow 13).

By adapting the surface of the core 6, it can be ensured that its temperature T is such that the wavelengths of the reemitted radiation are located in the band $B_1$; the result is that the reemitted radiation (arrow 13) is absorbed by the plastic material that comprises the wall of the preform and heats it at the vicinity of the internal side 8 (temperature $T_i$). Thus, the wall of the preform is heated at both its internal and external sides, while the source of heating is not at all altered and remains outside of the preform in a unilateral configuration.

Furthermore, an appropriate choice for the surface 7 of the core 6 and the space e can ensure that the internal side 8 of the wall of the preform is raised to a temperature $T_i$ which is significantly greater (in actuality at least 5° C.) than the temperature $T_e$ of the external side 10 of the wall; a positive temperature gradient $\Delta T = T_i - T_e$ ($T_i > T_e$) is thus produced between the internal 8 and external 10 sides. In FIG. 2, the curve C depicts a possible variation of the temperature inside the thickness of the wall, between $T_i$ and $T_e$. It is thus assured that the plastic material will be locally heated to the appropriate temperatures without any risk to the stretching rates that it will be subject to during the process of blow moulding or stretch-blow moulding.

The smaller the space e, the greater the energy reemitted by the core which reaches the internal side 8, the higher the temperature $T_i$, and therefore the wider the temperature differential $T_i - T_e$.

For a specific value of space e, a core with a black matte surface triggers heating of the internal side which is greater than a core with a light and brilliant surface. In the first case, the temperature $T_i$ can be 20° C. greater than temperature $T_e$, while it will only be 10° C. greater in the second case.

In view of the influence of those parameters, it is clear that the heating of the preform can be modulated or separated into zones, lengthwise as well as angularly, by varying the surface and/or the space e of specific zones of the core. In particular, it is possible to modulate the heating of the preform by zones to facilitate the manufacture of receptacles with complex shapes and/or that display a variable thickness.

In FIG. 1, the core 6 has a simple shape which corresponds roughly to the shape of the internal side of the preform, so that the space e is approximately constant.

During heating, the core 6 can also be driven in rotation (arrow 14) in synchronism with preform 1, or else not be driven, the preform 1 rotating alone around the core.

Figure 5:
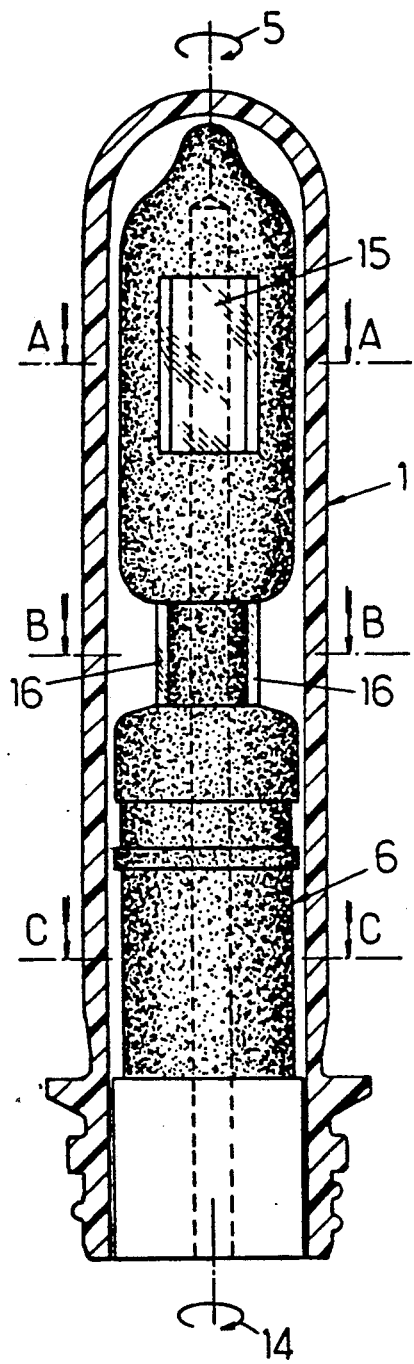
FIG. 5 is a variant of the embodiment of FIG. 1.
Figure 6A:
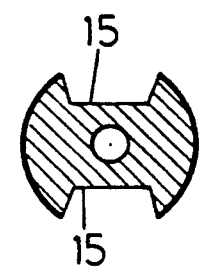
FIGS. 6A, 6B and 6C are cross-sectional views taken on lines AA, BB and CC, respectively, through the core of FIG. 5.
Figure 6B:
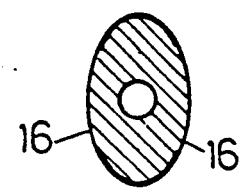
Figure 6C:
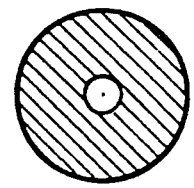

In FIG. 5 a core 6 is depicted with a complex shape, with a space e that is not constant both lengthwise and angularly and of which some zones, such as at 15 and 16, are brilliant (for example polished metal) while the remainder of the core is of a dark shade (for instance matte black). FIGS. 6A, 6B and 6C are sections taken on lines AA, BB and CC, respectively, of FIG. 5, and depict the shapes of the various sections of the core. In such a case, the core must rotate in synchronism with the preform to preserve the angular thermal discontinuities.

As such and from what precedes, the invention does not restrict itself at all to those of its embodiments that have been specifically thought of; on the contrary, it encompasses all variants.

We claim:

1. A method for heating preforms having a relatively thick wall made of plastic material for the manufacture by blow moulding or stretch-blow moulding of receptacles, said method comprising the steps of:

a) irradiating the preforms with infrared radiation emitted by at least one source, said at least one source located outside of the preforms to heat the preforms transverse to their longitudinal axes, said infrared radiation (4) including a first wavelength band ($B_1$) which is absorbed by the plastic material comprising the wall (2) of the preforms (1) and a second, shorter wavelength band ($B_2$), distinct from the first band, which is not absorbed by the plastic material and which penetrates inside the internal volume of the preforms, b) inside the internal volume of the preforms, modifying the second wavelength band ($B_2$) of the infrared radiation (12) which reaches inside said internal volume so as to transform it into radiation (13) with wavelengths included in the first band, and c) reemitting the infrared radiation with modified wavelengths back towards the walls of the preforms such that modified wavelengths are absorbed by the plastic material comprising the walls of the preforms in the vicinity of their internal surfaces, the infrared radiation exclusively heating the internal surfaces to a temperature $T_i$ so that the temperature $T_i$ of the internal surfaces of the preforms is greater than the temperature $T_e$ of the external surface, d) wherein the modification of the wavelengths of the radiation is implemented by introducing in said internal volume an elongate core having a treated surface that defines a gap (e) with the internal wall of the preform.

2. A method according to claim 1 wherein the temperature profile of the wall of the preforms is non-uniform axially and/or angularly, and said non-uniform temperature profile is obtained by providing an irregular interval between the core and the internal wall of the preform.

3. A method according to claim 1, wherein the temperature profile of the wall of the preforms is non-uniform axially and/or angularly, and said non-uniform temperature profile is obtained by using a core having an irregular surface treatment.

4. A method according to claim 3, wherein the core has a surface which exhibits brilliance and/or an irregular color.

5. A method according to claim 1, wherein the preforms are rotated about their longitudinal axes.

6. A method according to claim 2, wherein the cores and preforms are rotated about their longitudinal axes in synchronism.

7. A method according to claim 3, wherein the cores and preforms are rotated about their longitudinal axes in synchronism.

8. An apparatus for heating preforms (1) having a relatively thick wall (2) made of plastic material for the manufacture by blow moulding or stretch-blow moulding of receptacles, said apparatus comprising:

a) heating means including at least one source (4) of infrared radiation, said at least one source located outside of the preforms to heat the preforms transverse to their longitudinal axes, said infrared radiation including a first wavelength band ($B_1$) which is absorbed by the plastic material comprising the wall of the preforms and a second, shorter wavelength band ($B_2$), distinct from the first band, which is not absorbed by the plastic material and which penetrates inside the internal volume of the preforms, b) means disposed inside the preforms for converting the wavelengths of infrared radiation (12) included in the second band ($B_2$) into infrared radiation (13) with wavelengths included in the first band ($B_1$), and c) means for reemitting said converted infrared radiation towards the wall (2) of the preforms for absorption thereby, said converting and reemitting means being configured such that the absorbed converted wavelengths heat the internal surfaces (8) of the preforms to a temperature $T_i$ which is greater than the temperature of the external surfaces 10), d) wherein the means for converting and the means for reemitting are mutually combined and comprise an elongate core (6) introduced inside each preform and having a treated surface (7), and defining a gap (e) with the internal surace of the preform such that the temperature $T_i$ of the internal surface heated exclusively by infrared radiation is greater than temperature $T_e$ of the external surface.

9. An apparatus according to claim 8, wherein the surface of the core is axially and/or angularly irregular.

10. An apparatus according to claim 8, wherein the core has an irregular surface treatment axially and/or angularly.

11. An apparatus according to claim 10, wherein the core surface has a brilliant and/or an irregular color.

12. An apparatus according to claim 8, wherein the preform is axially rotated and the core remains static.

13. An apparatus according to claim 9, wherein the preform and the core are axially rotated.

14. An apparatus according to claim 10, wherein the preform and the core are axially rotated.

* * * * *